United States Patent [19]

Bodine et al.

[11] Patent Number: 4,929,925
[45] Date of Patent: May 29, 1990

[54] ALARM SYSTEM

[76] Inventors: David B. Bodine, 25 E. Common Rd.; Joseph R. Farkas, 52 Tersana Dr., both of Easton, Conn. 06612

[21] Appl. No.: 161,199

[22] Filed: Feb. 24, 1988

[51] Int. Cl.⁵ .......................... B60R 25/10; B60Q 1/00
[52] U.S. Cl. ..................................... 340/426; 340/435; 340/436; 340/541; 340/545; 307/9.1; 367/93; 180/167
[58] Field of Search ................ 340/63, 541, 545, 568, 340/571, 572, 426, 429, 435, 436, 903, 943; 367/93, 94, 95; 307/9.1, 10.1, 10.2; 180/167

[56] References Cited

U.S. PATENT DOCUMENTS

| | | | |
|---|---|---|---|
| 3,891,861 | 6/1975 | Picard et al. | 307/232 |
| 3,909,722 | 9/1975 | Bennet, Jr. | |
| 3,973,250 | 8/1976 | Uffelman | |
| 4,001,805 | 1/1977 | Golbe | |
| 4,054,867 | 10/1977 | Owens | |
| 4,064,507 | 12/1977 | Schmitz | 340/384 |
| 4,072,936 | 2/1978 | Spirig | 340/274 R |
| 4,092,636 | 5/1978 | Shepherd et al. | 340/552 |
| 4,134,109 | 1/1979 | McCormick et al. | 340/550 |
| 4,166,273 | 8/1979 | Riley, Jr. et al. | 340/539 |
| 4,170,769 | 10/1979 | Morris et al. | 340/384 E |
| 4,191,947 | 5/1980 | Bouchard et al. | 340/531 |
| 4,196,423 | 4/1980 | Carver et al. | 340/566 |
| 4,207,559 | 6/1980 | Meyer | 340/531 |
| 4,209,776 | 6/1980 | Frederick | 340/541 |
| 4,225,859 | 9/1980 | Zetting et al. | 340/566 |
| 4,242,743 | 12/1980 | Salem | 367/93 |
| 4,263,584 | 4/1981 | Sprig | 340/550 |
| 4,290,058 | 9/1981 | Bystricky | 340/566 |
| 4,306,228 | 12/1981 | Meyer | 340/566 |
| 4,414,652 | 11/1983 | Christ | 367/93 |
| 4,468,763 | 8/1984 | Braunling et al. | 367/136 |
| 4,470,040 | 9/1984 | Kaminishi | 340/566 |
| 4,580,125 | 4/1986 | Gotanda | 340/64 |
| 4,586,031 | 4/1986 | Grinneiser | 340/566 |
| 4,633,234 | 12/1986 | Gagnon | 340/566 |
| 4,639,902 | 1/1987 | Leverance et al. | 367/93 |
| 4,668,941 | 5/1987 | Davenport et al. | 340/550 |
| 4,684,929 | 4/1987 | Edwards et al. | 340/566 |

FOREIGN PATENT DOCUMENTS 0162779 7/1986 Japan .

Primary Examiner—Donnie L. Crosland
Attorney, Agent, or Firm—Kramer, Brufsky & Cifelli

[57] ABSTRACT

An alarm system monitors a region, and includes a transducer supported to aim toward a boundary of the region. The transducer transmits sonic waves and receives echoes. The system generates an initial value corresponding to the distance between the transducer and a boundary of the region at one time, and activates the transducer at a later time to generate a current value corresponding to the distance between the transducer and a location from which the echoes originate. A control compares the current value to the initial value and activates an alarm when the current value differs significantly from the initial value. In one embodiment of the invention, the transducer aims toward a window of a vehicle and thereby detects either opening of the window or an associated door, breakage of the window, or intrusion into the vehicle between the transducer and the window. Transducers mounted on the underside of a trunk lid and a hood detect lifting the trunk lid or hood, respectively. The hood transducer also detects elevation of the vehicle.

11 Claims, 3 Drawing Sheets

ALARM SYSTEM

BACKGROUND OF THE INVENTION

The invention relates generally to alarm systems, and deals more particularly with a sonic alarm system which detects intrusion into a defined space, relative movement between the alarm system and a reference point, and breakage of a window.

Various types of alarm systems were previously known. For example, an electric eye detects the presence of an object between a light source and a detector. An infrared sensor detects the presence of a warm body in the field of the sensor. Sound level alarm systems detect a source of sound, and vibration alarm systems detect a source of vibration.

One problem with previously known alarm systems is false positives. For example, a sound level alarm system may be inadvertently activated by a loud noise outside of a room or automobile in which the system is installed, especially if a window or door of the room or automobile is open. A vibration sensitive alarm system may be inadvertently activated by a remote source of vibrations, or non-harmful contact with an automobile in which the system is installed. An infrared alarm system may be inadvertently activated by a heat source outside of a room or automobile in which the system is installed if the sensor is aligned with an open window and the heat source is located outside the window.

Accordingly, a general object of the present invention is to provide a reliable alarm system.

A more specific object of the present invention is to provide a reliable alarm system which can he used in an automobile, truck, room, or other defined space.

Another specific object of the present invention is to provide an alarm system which minimizes false positives.

Still another specific object of the present invention is to provide an alarm system which can detect intrusion through an open door, open window or predefined boundary in space without being activated by moving or warm bodies beyond the opening or boundary.

Yet another specific object of the present invention is to provide an alarm system which can detect opening of a door, a window, a vehicle hood, a vehicle trunk lid, or the elevation of an automobile or truck.

Still another object of the present invention is to provide an alarm system which can detect intrusion into a predefined space which is not enclosed by physical boundaries.

SUMMARY OF THE INVENTION

The invention resides in an alarm system including a transducer supported to aim toward a boundary of a region. The transducer transmits a sonic wave and receives echoes therefrom. Means are provided for generating an initial value corresponding to the distance between the transducer and the boundary at one time. A clock activates the transducer at a later time and generates a current value corresponding to the distance between the transducer and a location from which echoes received by the transducer originate. A control compares the current value to the initial value and activates an alarm when the current value differs significantly from the initial value indicating that either the boundary has moved relative to the transducer or intrusion has been made into the region.

According to one feature of the invention, the transducer is supported within an automobile to aim toward a window of either the driver or passenger side, and the initial value corresponds to the distance between the transducer and the window. If either the window or door is opened, or if a person intrudes between the transducer and the window, then the alarm is activated.

According to another feature of the invention, if the window is left open when the alarm system is armed, the alarm system detects intrusion into the automobile but is not set off by activity outside of the automobile.

According to other features of the invention, another transducer is mounted on the underside of a trunk lid and detects lifting of the trunk lid, and still another transducer is mounted on the underside of an automobile hood, and detects either lifting of the hood or vehicle.

DETAILED DESCRIPTION OF THE INVENTION

Figure 1:
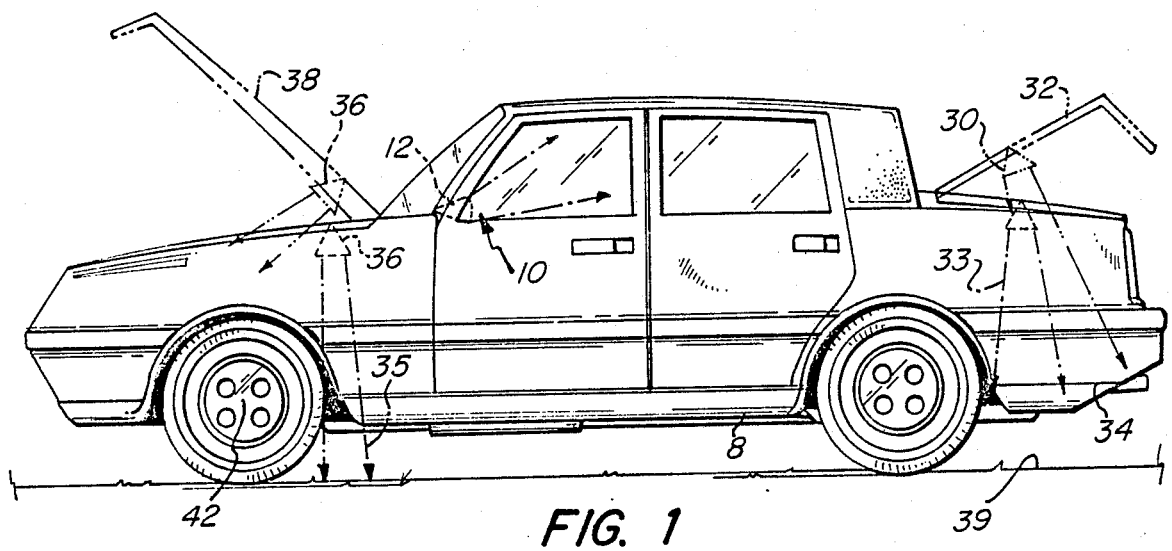
FIG. 1 is a side elevational view of an automobile, and an alarm system embodying the present invention installed therein with elevated positions of the automobile hood and trunk lid and sound waves shown in broken line.
Figure 2:
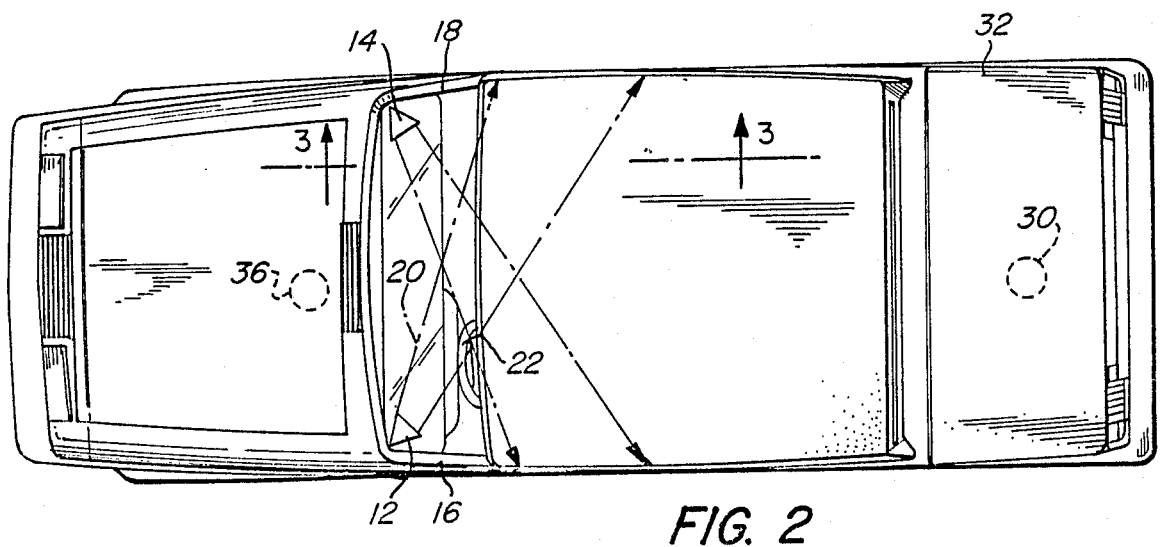
FIG. 2 is a top, plan view of FIG. 1 which view schematically illustrates in solid line alarm sensors within the automobile cabin and in broken line, associated sound waves and also alarm sensors under the hood and trunk lid.
Figure 3:
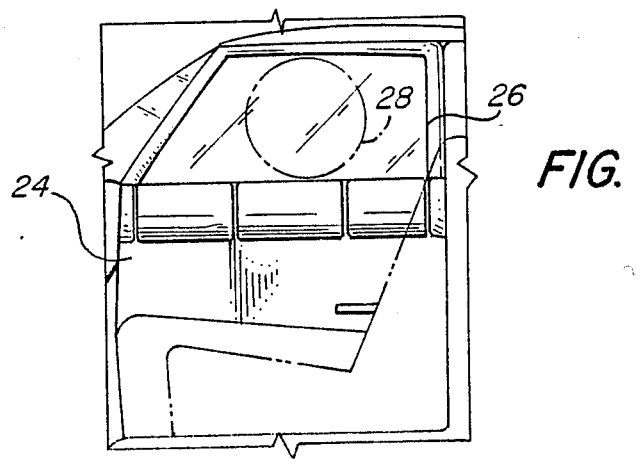
FIG. 3 is a partial cross-sectional view taken along the line 3—3 of FIG. 2 showing the profile of sonic waves transmitted by the alarm system in solid line on the inside of a window.

Referring now to the figures in detail wherein like reference numerals indicate like elements throughout the several views, FIGS. 1, 2 and 3 illustrate an automobile equipped with an alarm system generally designated 10 in accordance with the present invention. The alarm system 10 includes alarm sensors 12 and 14 in the form of transducers supported on roof columns 16 and 18, respectively. The alarm sensor 12 is positioned to transmit sonic waves or beam 20 over a steering wheel 22 and toward a front passenger side window 26 such that the sonic waves impinge upon an area 28 illustrated in FIG. 3. The alarm sensor 14 similarly irradiates or impinges upon the driver-side window. When the automobile is unoccupied, either by a person or large object, preferably nothing intercepts either of the sonic waves transmitted by sensors 12 and 14 toward the respective windows.

As described in more detail below, sensors 12 and 14 can detect opening of the windows and doors adjacent to the front seat, entry of objects into the front portion of the automobile cabin, and removal of objects (if any) from the front seat, but are not set-off by activity outside of the automobile. If desired, sensors similar to sensors 12 and 14 may be installed to monitor rear doors and windows of the automobile, entry into the rear of the automobile, removal of objects from the rear seat or entry through a sunroof or convertible top (if any). Such sensors radiate sonic waves toward the rear doors and windows, sunroof and convertible top.

Alarm system 10 further includes an alarm sensor 30 mounted on the underside of a trunk lid 32 to radiate sonic waves 33 toward a bottom 34 of the trunk. As described in more detail below, sensor 30 detects raising of the trunk lid 32.

Alarm system 10 further includes an alarm sensor 36 mounted on the underside of a hood 38 and positioned to radiate sonic waves 35 through gaps between the engine and other components under the hood such that the associated sonic wave passes uninterruptedly to a location on ground 39 underneath the automobile. Preferably, the alarm sensor 36 is positioned such that the beam passes rearwardly of a front axle 42 so that alarm sensor 36 can detect lifting of the automobile from either end. Also, alarm sensor 36 detects lifting of hood 38 as described in more detail below. If, in a particular application of the alarm system 10, there is no suitable space for the transmission of the sonic waves from the sensor 36 through the gaps noted above, another sensor (not shown) may be supported below a chassis of the automobile and aimed downwardly to detect lifting of the automobile. In such a case, the sensor 36 detects lifting of the hood 38 by change of position relative to the engine or other mechanical component toward which it radiates.

Figure 4:
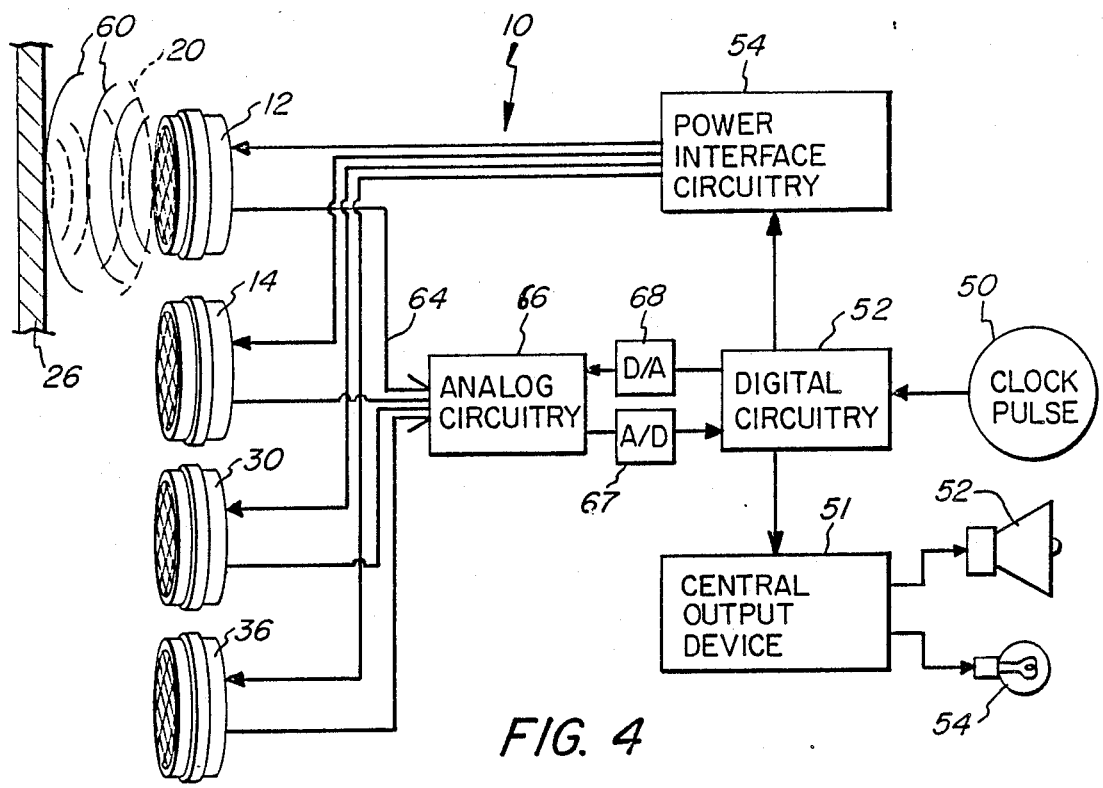
FIG. 4 is a block diagram of electronic circuitry and sensors of the alarm system of FIG. 1.

FIG. 4 is a block diagram of electronic circuitry, sensors 12, 14, 30 and 36, an alarm horn 52 and an optional alarm lamp 54. Before describing the actual operation of alarm system 10 in detail, it will be helpful to describe the principle of operation in reference to sensor 12. A clock 50 generates a pulse which begins a cycle of operation. In response, digital circuitry 52 activates a power interface circuit 54 comprising a power driver such as an FET, which power interface circuit 54 electrically drives sensor 12. Sensor 12 comprises a standard piezo-electric or other type of electrical/mechanical transducer which generates a burst of sonic energy or waves 20 within its operating band. The digital circuitry also notes the time of transmission of waves 20. The sound waves may impinge upon window 26 yielding an echo 60. A portion of echo 60 impinges upon transducer 12 yielding a corresponding electrical signal on conductor 64. The corresponding electrical signal is processed by an analog circuit which amplifies the electrical signal, filters out energy not associated with the transmitted wave 20, and detects the echo. The processed analog signal is transmitted via an analog to digital converter 67 to digital circuitry 52 which records the time of arrival of the echo. It should be noted that gain and bandwidth control of analog circuitry 66 are provided by the digital circuitry via a digital to analog converter 68. The arrival time corresponds to the distance from the transducer to the window 26 based on the known velocity of sound in air. Thus, alarm system 10 effectively measures the distance from sensor 12 to the window or any object therebetween.

It should be noted that if either the door or window is open or the window is broken, then the echo is received at a later time than if both are closed and the window is intact (assuming that no object is interposed between the sensor and the window). Thus, sensor 12 can detect whether the door and window are open or closed, whether the window 26 has been broken, whether an object has entered into the path of the transmitted wave 58 within the automobile cabin, or whether an object placed by an owner of the automobile in the path of the transmitted wave 58 has been moved. The transducer 14 detects similar events on the opposite side of the automobile. The transducer 30 detects opening of the trunk lid by the change in distance from transducer 30 to the bottom of the trunk. The transducer 36 detects either lifting of the hood or the entire automobile by change in distance from transducer 36 to the ground. This protects the automobile parts under the hood, the tires, and the entire automobile against towing or theft.

Figure 5:
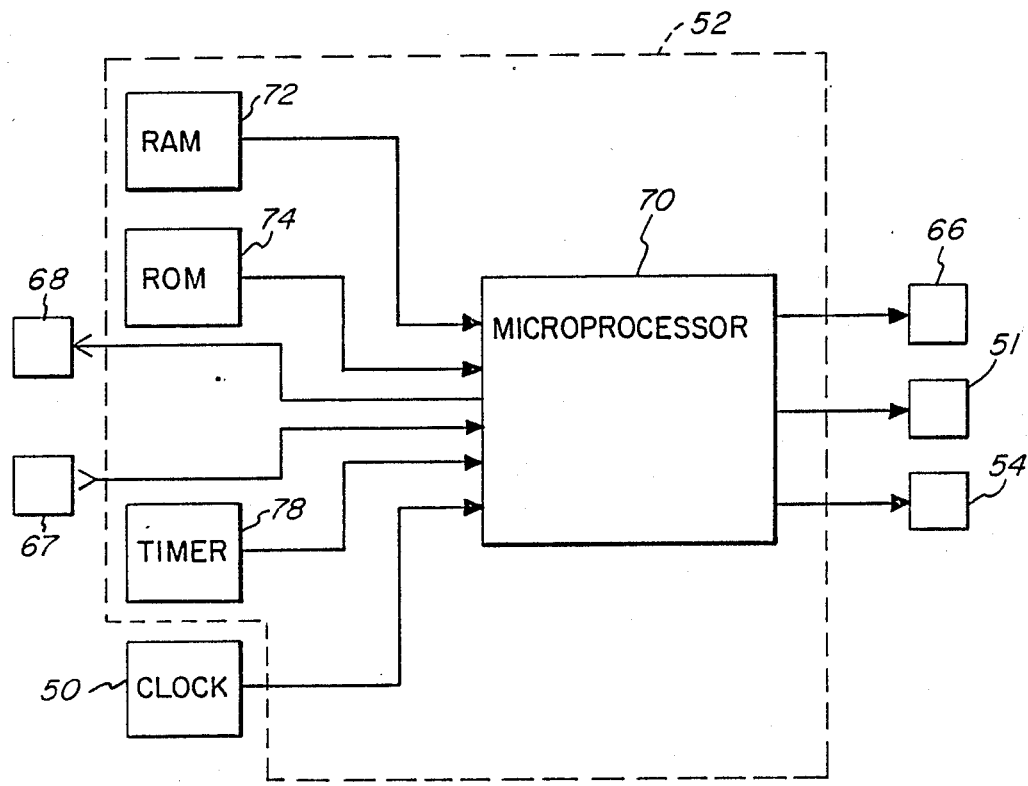
FIG. 5 is a block diagram in more detail of a digital circuit block of FIG. 3.

FIG. 5 illustrates the digital circuitry 52 in more detail, which digital circuitry includes a microprocessor 70, a random access memory (RAM) 72, and a read only memory (ROM) 74 which stores an operating program for the microprocessor. Digital circuitry 52 further includes an A/D converter 76 connected between the analog circuit 66 and microprocessor 70 to indicate to the microprocessor the magnitude of the echoes in digital form, and a timer 78 by which the microprocessor measures the time of transmission of the transmitted waves and the time of receipt of the echoes. By way of example, timer 78 comprises a counter and an associated high frequency clock which continuously increments the counter to yield a count output representative of elapsed time.

During installation of the alarm system 10, data corresponding to the distance from transducer 12 to the window 26 in the closed position of the door and window is stored in RAM 72. This was done by simply closing the door 24 and window 26, transmitting the waves 20, and recording the time of arrival of the echo 60 at the transducer 12. A similar procedure was followed for the transducer 14.

Figure 6:
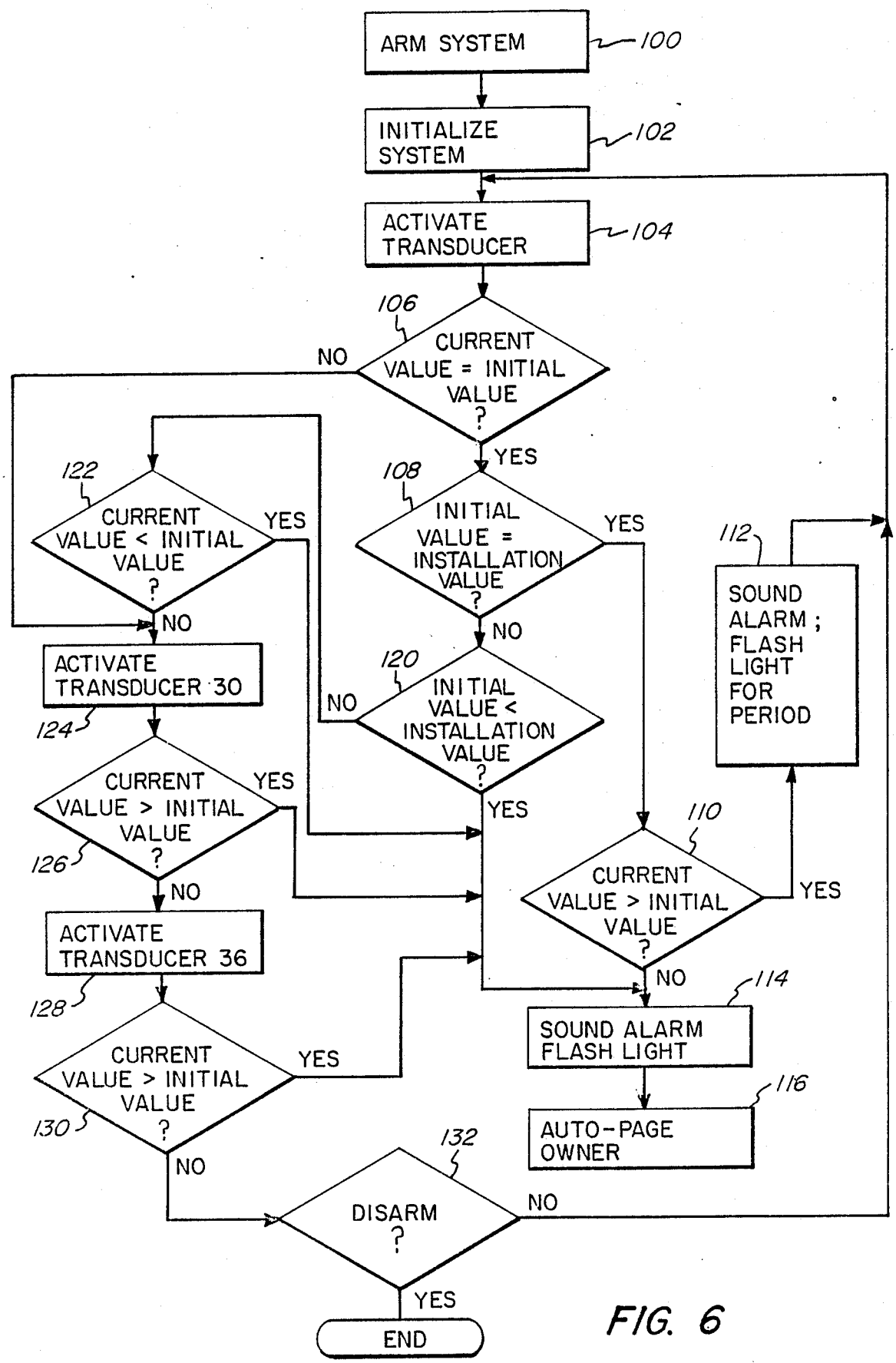
FIG. 6 is a flow chart illustrating the operation of a microprocessor within the digital circuit block of FIG. 3.

FIG. 6 is a flow chart of firm wave stored in ROM 74 controlling further operation of microprocessor 70 in accordance with the present invention. In step 100, the microprocessor is activated or armed. By way of example, the activation is automatically triggered by the locking of the automobile doors but may be disarmed by a manually operated switch (not shown). If the automobile is occupied either by a person or an animal, then the system should not be armed because such occupation is likely to activate the alarm.

Next, the system is initialized; each of the transducers 12, 14, 30 and 36 is activated in sequence and the times between transmission and arrival of the respective echoes are stored in RAM 72 and designated the "initial values" corresponding to the distance from each transducer to an object in the path of its transmitted wave (step 102). Then, the microprocessor 70 periodically activates each of the transducers as follows. In step 104, microprocessor 70 activates transducer 12 and notes the time of transmission of the wave and the arrival of the associated echo, if any, to yield a "current value." This current value 11 corresponds to the distance from transducer 12 to its target and in step 106 is compared to the corresponding initial value measured in step 102. If there is a significant difference between the current value and the initial value, then step 106 leads to step 108 in which microprocessor 70 compares the initial value to the corresponding installation value stored in memory. If the initial value equals the installation value, this means that at the time the alarm system 10 was armed, the door 24 and window 26 were closed and step 108 leads to step 110. The microprocessor then determines in step 110 whether the current value is greater than the initial value. If so, this indicates that either the door 24 has been opened, the window 26 has been opened, or the window 26 has been broken such that transmitted waves 20 pass through the broken window without substantial reflection back toward transducer 12. In any of these three situations, the microprocessor activates horn 52 (and optional lamp 54) for a predetermined period in an attempt to ward off the intruder (step 112). If, on the other hand, the current value is less than the initial value, this indicates intrusion into the automobile cabin within the path of transmitted waves 20, and step 110 leads to step 114 in which the horn 52 and optional lamp 54 are activated for a longer period (step 114) and optionally, the owner is paged (step 116) by a radio transmitter (not shown). It should be noted that after step 112, the microprocessor loops back to the step 104 to check for intrusion into the automobile as described above.

Returning to step 108, if the initial value was not equal to the installation value, then the microprocessor determines whether the initial value is less than the installation value (step 120). If so, this indicates that when the system was armed, there was an object in the cabin in the path of transmitted waves 20, and step 120 leads to the steps 114 and 116 because the object has been moved.

If in the step 120, it is determined that the initial value was greater than the installation value, this indicates that at the time of arming the system, either the door 24 or the window 26 was left open. In such a case, step 120 leads to a step 122 in which the microprocessor determines whether the current value is less than the initial value. If so, this indicates intrusion into the automobile cabin in the path of transmitted waves 20, and step 122 leads to the alarm steps 114 and 116. If, on the other hand, the current value is greater than or equal to the initial value, this indicates the receipt of an echo from a target located outside of the automobile cabin and, because such a target is not a threat to the security of the automobile, no alarm is activated. In this case, step 122 leads to a step 124 in which transducer 30 located under the trunk lid is activated and the time between transmission of the wave and receipt of the echo is measured. This current value represents the distance from the sensor to either the bottom of the trunk or the top of an object located within the trunk, and is compared to the initial value determined in step 102 upon arming of system 10. If the current value is significantly greater than the initial value, this indicates that the trunk lid 32 has been opened, and step 126 leads to the alarm steps 114 and 116.

If no such change was detected in step 126, then microprocessor 70 activates the hood transducer 36 and measures the current value representing the distance from transducer 36 to the ground (step 128). This current value is compared to the initial value detected in step 102 at the time of arming the system, and if the current value is greater than the initial value, this indicates that either the automobile or hood has been lifted, and step 130 leads to the alarm steps 114 and 116. It should be noted that the alarm will not be activated if a ball rolls or snow collects under the automobile.

If the current value is not greater than the initial value, step 130 leads to step 132 in which microprocessor 70 determines whether the system has been disarmed, presumably by the owner, by the manually operated switch (not shown) or by the unlocking of the doors. If the system has not been disarmed, then step 132 leads to step 104 to begin another cycle of monitoring the transducers. It should be noted that the flow chart of FIG. 5 does not illustrate the operation of transducer 14; however, this was intended to simplify the flow chart and the description of the invention. The transducer 14 operates according to the same steps as transducer 12. Moreover, if desired, additional transducers similar to transducer 12 may be installed to monitor the rear doors and back seat of the automobile or to monitor a sunroof or convertible top.

Based on the foregoing, an alarm system embodying the present invention has been disclosed. However, numerous modifications and substitutions may be made without deviating from the scope of the invention. For example, if desired, microprocessor 70 may be further programmed to avoid activating the alarms unless an alarm condition is sensed during two consecutive iterations of the steps 104–130. Also, if desired, the transducer 12 can be supported to aim toward door 24 instead of window 26. Also, the alarm system can be installed in other types of vehicles, buildings, boats, etc. Therefore, the invention has been disclosed by way of illustration and not limitation, and reference should be made to the following claims to determine the scope of the invention.

We claim:

1. An alarm system for detecting movement of a vehicle upwardly from a surface supporting said vehicle, said alarm system comprising:
    transducer means, facing downwardly toward said surface, for transmitting a sonic wave toward and receiving an echo from said surface;
    an alarm;
    electronic means for activating said transducer means to transmit a sonic wave and receive an echo and thereby determine a parameter indicative of a reference distance from said transducer means to said support surface; and
    means for periodically activating said transducer means and comparing current data corresponding to the distance from said transducer means to said support surface to said reference distance, and activating said alarm if said current data indicates a current distance that is significantly greater than said reference distance.

2. An alarm system as set forth in claim 1 wherein said transducer means transmits said sonic wave between front and rear axles of said vehicle.

3. An alarm system for monitoring a region, said system comprising:
    transducer means, supported to aim toward a boundary of said region, for transmitting a sonic wave and receiving echoes therefrom;
    means for generating an initial value corresponding to the distance between said transducer means and said boundary at one time;
    means for activating said transducer means at a later time and generating a current value corresponding to the distance between said transducer means and a location from which echoes received by the transducer means originate; and
    control means for comparing said current value to said initial value and activating an alarm when said current value differs significantly from said initial value;
    wherein said transducer means is supported from a vehicle to aim toward a surface upon which the vehicle rests;

wherein said initial value corresponds to the distance between said transducer means and said surface; and wherein said control means detects lifting of said vehicle by detecting a change in the current value with respect to the initial value.

4. An alarm system according to claim 3, wherein the transducer is supported from a hood of said vehicle to aim downwardly towards the surface upon which the vehicle rests.

5. An alarm system according to claim 3, further comprising:

second transducer means supported to aim towards a window of said vehicle, for transmitting and receiving echoes therefrom, means for generating a second initial value corresponding to the distance between said second transducer means and said window at one time; and means for activating said second transducer means at a later time and generating a second current value corresponding to the distance between said second transducer means and a location from which echoes received by the second transducer means originate;

wherein the control means compares said second current value to said second initial value and activates the alarm when said second current value differs significantly from said second initial value.

6. In combination with an automobile, an alarm system for monitoring a region within said automobile, said system comprising:

transducer means, supported to aim toward a boundary of said region, for transmitting a sonic wave and receiving echoes therefrom;

means for generating an initial value corresponding to the distance between said transducer means and said boundary at one time;

means for activating said transducer means at a later time and generating a current value corresponding to the distance between said transducer means and a location from which echoes received by the transducer means originate; and control means for comparing said current value to said initial value and activating an alarm when said current value differs significantly from said initial value;

wherein:

said transducer means is supported to aim toward a window of a vehicle;

said system further comprising:

means for generating an installation value corresponding to the distance between said transducer means and said window when said window and a door which supports said window are both closed;

said initial value is generated when the system is armed and said initial value is greater than said installation value; and said control means activates the alarm only if the current value is less than the initial value but nit if the current value is greater than the initial value.

7. An alarm system for monitoring a region, said system comprising:

transducer means supported to aim towards boundary of said region, for transmitting a sonic wave and receiving echoes therefrom;

means for generating an initial value corresponding to the distance between said transducer means and said boundary at one time;

means for activating said transducer at a later time and generating a current value corresponding to the distance between said transducer means and a location from which echoes received by the transducer means originate; and control means for comparing said current value to said initial value and activating an alarm when said current value differs significantly from said initial value;

wherein said transducer means is supported to aim toward a window of a vehicle;

wherein said system further comprising:

means for generating an installation value corresponding to the distance between said transducer means and said window when said window and a door which supports said window are both closed;

wherein said initial value is generated when the system is armed and said value is greater than said installation value; and wherein said control means activates the alarm only if the current value is less than the initial value, but not if the current value is greater than the initial value.--

8. An alarm system for monitoring a region, said system comprising:

transducer means, supported to aim toward a boundary of said region, for transmitting a sonic wave and receiving echoes therefrom;

means for generating an initial value corresponding to the distance between said transducer means and said boundary at one time;

means for activating said transducer means at a later time and generating a current value corresponding to the distance between said transducer means and a location from which echoes received by the transducer means originate; and control means for comparing said current value to said initial value and activating an alarm when said current value differs significantly from said initial value;

wherein said transducer means is supported from a hood of a vehicle to aim downwardly toward a surface upon which the vehicle rests; and wherein said control means detects lifting of said hood by detecting a change in the current value with respect to the initial value.

9. An alarm system for monitoring a region, said system comprising:

transducer means, supported to aim toward a boundary of said region, for transmitting a sonic wave and receiving echoes therefrom;

means for generating an initial value corresponding to the distance between said transducer means and said boundary at one time;

means for activating said transducer means at a later time and generating a current value corresponding to the distance between said transducer means and a location from which echoes received by the transducer means originate; and control means for comparing said current value to said initial value and activating an alarm when said current value differs significantly from said initial value;

wherein said transducer means is supported to aim toward a window of a vehicle; and means for generating an installation value corresponding to the distance between said transducer means and said window when said window and a door which supports said window are both closed;

wherein said initial value is generated when the system is armed and said initial value is greater than said installation value; and wherein said control means activates the alarm only if the current value is less than the initial value but not if the current value is greater than the initial value.

10. An alarm system for monitoring a region, said system comprising:

transducer means, supported to aim toward a boundary of said region, for transmitting a sonic wave and receiving echoes therefrom;

means for generating an installation value corresponding to the distance between said transducer means and said boundary when the transducer is initially disposed to monitor said region;

means for generating an initial value corresponding to the distance between said transducer means and said boundary at one time;

means for activating said transducer means at a later time and generating a current value corresponding to the distance between said transducer means and a location from which echoes received by the transducer means originate; and control means for comparing said current value to said initial value and activating an alarm when said current value differs significantly from said initial value and said initial value is not greater than said installation value, and for comparing said current value to said installation value and activating an alarm when said current value is less than said installation value and said initial value is greater than said installation value.

11. An alarm system according to claim 10 wherein said transducer is supported inside a vehicle and said boundary coincides with a window of said vehicle.

* * * * *

UNITED STATES PATENT AND TRADEMARK OFFICE
CERTIFICATE OF CORRECTION

PATENT NO. : 4,929,925
DATED : May 29, 1990
INVENTOR(S) : David B. Bodine, Joseph R. Farkas It is certified that error appears in the above-identified patent and that said Letters Patent is hereby corrected as shown below:

Column 7, in Claim 6, line 59, "nit" should be --not--.

Signed and Sealed this

Thirtieth Day of July, 1991

Attest:

*Attesting Officer*

HARRY F. MANBECK, JR.

*Commissioner of Patents and Trademarks*